(12) United States Patent
Ito

(10) Patent No.: US 6,715,833 B2
(45) Date of Patent: Apr. 6, 2004

(54) SLIDE RAIL STRUCTURE OF SEAT FOR VEHICLE

(75) Inventor: Keishiro Ito, Yokohama (JP)

(73) Assignee: NHK Spring Co., Ltd., Kanagawa (JP)

(*) Notice: Subject to any disclaimer, the term of this patent is extended or adjusted under 35 U.S.C. 154(b) by 0 days.

(21) Appl. No.: 10/178,927

(22) Filed: Jun. 25, 2002

(65) Prior Publication Data
US 2002/0195857 A1 Dec. 26, 2002

(30) Foreign Application Priority Data
Jun. 25, 2001 (JP) ........................................ 2001-191791

(51) Int. Cl.$^7$ ................................................. B60N 2/02
(52) U.S. Cl. ........................................ 297/341; 248/429
(58) Field of Search ............................... 297/341, 344.1; 248/429

(56) References Cited

U.S. PATENT DOCUMENTS

| | | | |
|---|---|---|---|
| 4,101,169 A | * 7/1978 | Muraishi et al. ............. 297/341 |
| 4,856,847 A | * 8/1989 | Kanai ........................ 297/341 |
| 4,881,774 A | * 11/1989 | Bradley et al. .............. 297/341 |
| 4,909,570 A | * 3/1990 | Matsuhashi .................. 297/341 |
| 5,597,206 A | * 1/1997 | Ainsworth et al. ..... 297/378.12 |
| 5,717,300 A | * 2/1998 | Baloche et al. ............. 318/282 |
| 5,785,291 A | * 7/1998 | Chang ........................ 248/429 |
| 5,927,809 A | * 7/1999 | Tame ........................ 297/341 |
| 6,439,531 B1 | * 8/2002 | Severini et al. ............. 248/423 |
| 6,616,233 B1 | * 9/2003 | Debus et al. ................ 297/341 |

* cited by examiner

Primary Examiner—Peter M. Cuomo
Assistant Examiner—Stephen O'Adamo
(74) Attorney, Agent, or Firm—Arent Fox PLLC (57) ABSTRACT

A slide rail structure for a seat for a vehicle comprises a supporting device extending in a longitudinal direction of a vehicle and a moving device supported to the supporting device so as to freely move in the longitudinal direction and to which the seat for the vehicle is mounted. A stopper is provided in front of a rearmost end position of the moving device. An engaging device which does not engage with the stopper when the moving device is moved to a front side and engages with the stopper when the moving device is moved to a rear side is provided in the moving device. A lock canceling device for canceling an engagement state between the engaging device and the stopper interlocking with a tilting operation of a backrest portion of the seat for the vehicle is provided.

10 Claims, 6 Drawing Sheets

SLIDE RAIL STRUCTURE OF SEAT FOR VEHICLE

BACKGROUND OF THE INVENTION

1. Field of the Invention

The present invention relates to improvement of a slide rail structure for a seat for a vehicle which slides the seat in a longitudinal direction.

2. Description of the Related Art

In recent years, sport-utility vehicles (SUV) and the like are provided with a third row of seats which can be stored or can be installed and removed. However, sufficient leg room for a passenger in the third row of seats is not provided in most cases. Accordingly, there is provided a automobile in which a second row of seats is supported on sliding rails so as to freely move in a longitudinal direction and the second row of seat is moved forward when the passenger is to sit in the third row of seats. In the automobile mentioned above, there is employed a walk-in specification in which it is possible to secure the leg space in sitting in the third row of seats, and the passenger can get in and out of the third row of seats from a rear side of the second row of seats.

When making the second row of seats to allow sitting after the passenger sits in the third row of seats in the walk-in state, there is a case in which the second row of seats is moved to the rearmost end. In such a case, there is a risk that the second row of seats will hit against the foot of a passenger. In a car having two doors, there is a car in which in the case of returning a first row of seats to a state to allowing sitting after changing the first row of seats from the sitting state to a walk-in state, the position in the sitting state is set and the first row of seats is locked to the slide rails at that position. If such a memory function is applied to the second row of seats mentioned above, it is possible to prevent the seat from being moved to the rearmost end when the seat is moved rearward. However, in the conventional walk-in seat with the memory function, the seat can be locked to the slide rails only at one set sitting position.

In the second row of seats for the automobile provided with the third row of seats, there is a structure having a high utility in which a back surface of a backrest can be used as a table by tilting the backrest to a front side so as to make it substantially horizontal. The table mentioned above can be used by the passenger sitting in the second row of seats which is not utilized as a table, and by the passenger sitting in the third row of seats. In this case, in order to ensure an interior comfortable for the passenger in the third row of seats, it is necessary to move the second row of seats forward. Furthermore, when the second row of seats is used as a table, it is difficult to use the seat as a table unless the seat is locked to the slide rails. It can be considered that the position at which the second row of seats is used as a table is set by applying the memory function mentioned above. However, it is troublesome for the user to force the setting of the matter mentioned above, and in any case, the seat can be locked in only one portion.

As mentioned above, in the conventional walk-in seat in which the second row of seats can be moved, there is a problem of a danger of hitting the seat against the foot of a passenger in the third row of seats when the seat is changed from the walk-in state to the sitting state, and in the conventional walk-in seat with the memory function, there is a problem that the seat cannot be locked to the slide rails at an optional position.

In the case of using the second row of seat as a table, two kinds of hinge structures which rotatably connect the sitting portion of the seat to the backrest are provided for getting on and off and for the table. In the case of tilting the backrest forward by using the hinge structure for the table, it can be considered that the structure is made such that the engagement state between the sitting portion and the slide rails is maintained. However, in accordance with the structure mentioned above, there is a problem in that the number of parts is increased, the weight and the manufacturing cost are increased, and the operation becomes troublesome.

SUMMARY OF THE INVENTION

Accordingly, an object of the present invention is to provide a slide rail structure for a seat for a vehicle which can prevent the seat from moving to the rearmost end when the seat is changed from a walk-in state to a sitting state by a simple structure. Furthermore, an object of the present invention is to provide a slide rail structure for a seat for a vehicle which can lock a seat at an optional position.

In accordance with the present invention, there is provided a slide rail structure of a seat for a vehicle comprising: a supporting device extending in a longitudinal direction of a vehicle; and a moving device supported by the supporting device so as to freely move in the longitudinal direction and to which the seat for the vehicle is mounted, wherein a stopper is provided in front of the rearmost end position of the moving device, an engaging device which does not engage with the stopper when the moving device is moved to a front side and engages with the stopper when the moving device is moved to a rear side is provided in the moving device, and a lock canceling device for canceling an engagement state between the engaging device and the stopper interlocking with a tilting operation of a backrest portion of the seat for the vehicle is provided.

In the slide rail structure having the structure described above, the engaging device provided in the moving device engages with the stopper and does not move up to the rearmost end when the seat for the vehicle is moved to the rear side. Accordingly, the seat for the vehicle does not hit the rear passenger. Furthermore, since the lock canceling device is operated, for example, by pulling up the backrest portion, it is possible to move the seat for the vehicle to a rear end side rather than being at that position. Even in the case of moving the seat for the vehicle up to the rearmost end at that time, a speed does not increase because a moving distance of the seat for the vehicle is short. Accordingly, even if the seat for the vehicle hits against the foot of the passenger, there is a reduced risk. Furthermore, since the seat is stopped before arriving at the rearmost end, it is possible to draw the operator's attention.

In this case, it is preferable that a locking device capable of engaging with the supporting device be provided in the moving device, an elastic member energizing the locking device so as to engage with the supporting device is provided, and an operation portion for manually canceling an engagement state with the supporting device is provided in the locking device. By operating the operation portion, it is possible to move the moving device so as to lock with respect to the supporting device at an optional position. In this case, the structure can be made simple by forming a serration or a groove continuously provided in a longitudinal direction in the supporting device, whereby a hook portion of the locking device is engaged with the serration. Furthermore, the operating device may be structured so as to be operated by foot.

It is preferable that the lock canceling device be structured such as to move the locking device interlocking with a forward tilting motion of the backrest portion so as to cancel the engagement state between the locking device and the supporting device. Accordingly, it is possible to move the seat for the vehicle merely by tilting forward the backrest portion without operating the operation portion, and the seat for the vehicle is automatically locked by raising the backrest portion so as to be set in the sitting state. Accordingly, operability can be improved and the seat for the vehicle can be easily used.

DESCRIPTION OF THE PREFERRED EMBODIMENT

A. Structure of Embodiment

A description will be given of an embodiment in accordance with the present invention with reference to FIGS. 1 to 7C. FIGS. 1 to 4 show a seat for a vehicle which is supported by a slide rail structure in accordance with the embodiment, and FIGS. 5A to 7C show the slide rail structure. First, a description will be given of a structure of the seat for a vehicle. In the drawings, reference numeral 1 denotes a sitting portion bracket. The sitting portion bracket 1 constitutes a part of a frame in a sitting portion 15 (refer to FIGS. 5A, 5B, and 5C).

Figure 1:
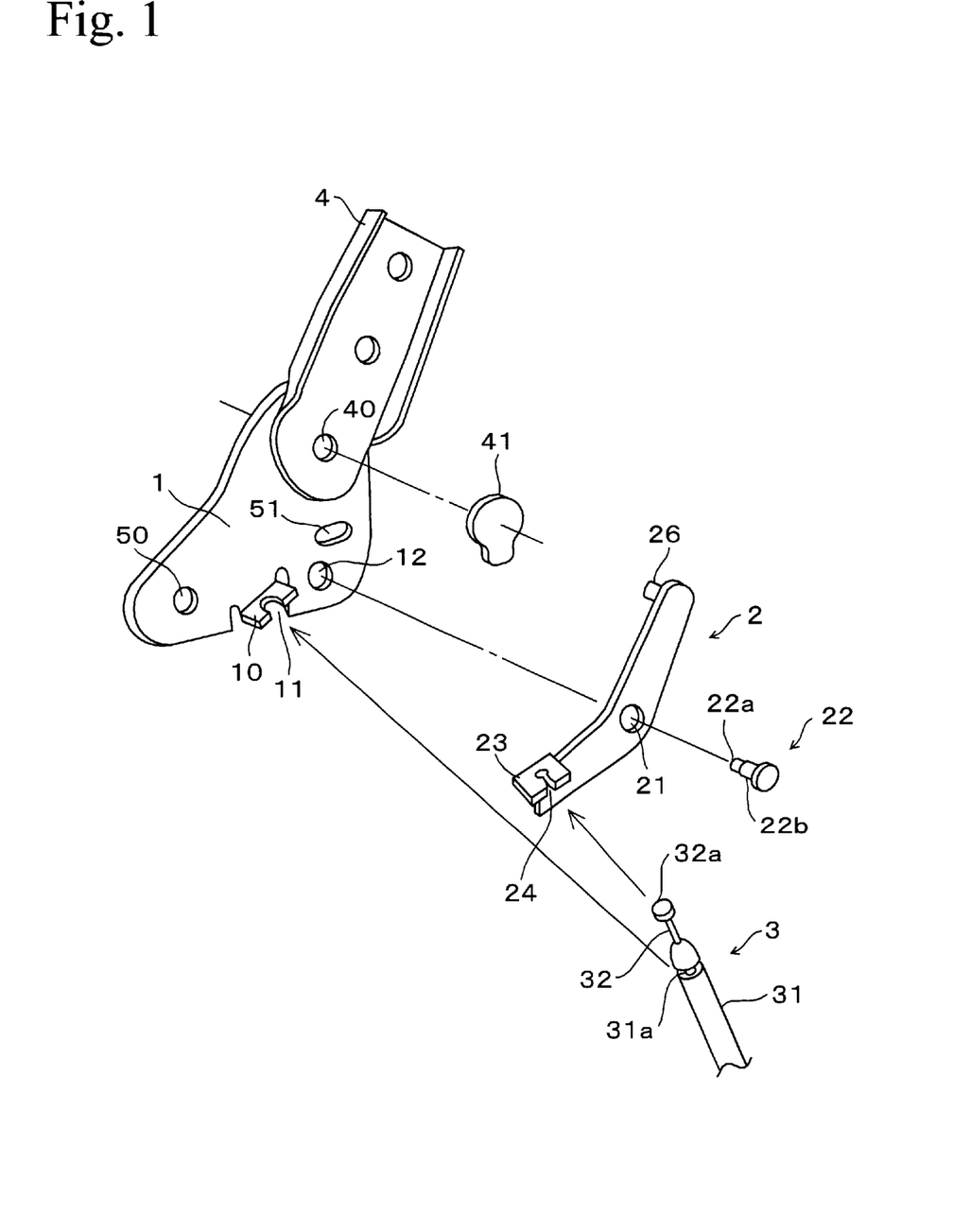
FIG. 1 is a perspective view showing a seat for a vehicle which is used in an embodiment in accordance with the present invention.

A hook 10 protruding in a lateral direction is formed in a center portion close to a lower edge portion of the sitting portion bracket 1. A groove 11 opening toward a side direction is formed in a center portion of the hook 10. Furthermore, a female screw 12 is formed in a portion apart from the hook 10 in a side direction.

Reference numeral 2 in the drawing denotes an arm. A hole 21 is formed in a middle portion in a longitudinal direction of the arm 2. A fitting portion 22b of a stepped pin 22 in which a screw 22a is formed at a front end is fitted to the hole 21, and the screw 22a is screwed to the female screw 12 of the sitting portion bracket 1. Accordingly, the arm 2 can freely rotate around the stepped pin 22. In this case, a mounting method for the stepped pin 22 is not limited to the screwing as mentioned above, and an optional device such as replacing the screw 22a of the stepped pin 22 with a pin, as well as replacing the female screw 12 with a hole, fitting the pin to the hole and caulking a front end of the pin, and the like, can be used. A hook 23 protruding in the same direction as that of the hook 10 is formed in one end portion of the arm 2. A groove 24 opening toward a side direction is formed in a center portion of the hook 23.

A pull cable 3 is mounted to the hooks 10 and 23. The pull cable 3 is constituted by an outer cable 31 and an inner cable 32 slidably inserted to a hollow portion of the outer cable 31. A groove 31a is formed in one end portion of the outer cable 31, and the groove 31a is engaged with the groove 11 of the hook 10. Furthermore, a head 32a having a large diameter is fixed to one end portion of the inner cable 32, and the head 32a is engaged with the groove 24 of the hook 23. In this case, reference numerals 50 and 51 in the drawing denote holes for mounting the sitting portion bracket 1 to the frame of the sitting portion. The hole 51 in a rear side is formed as a long hole in order to compensate for operational error.

Figure 5A:
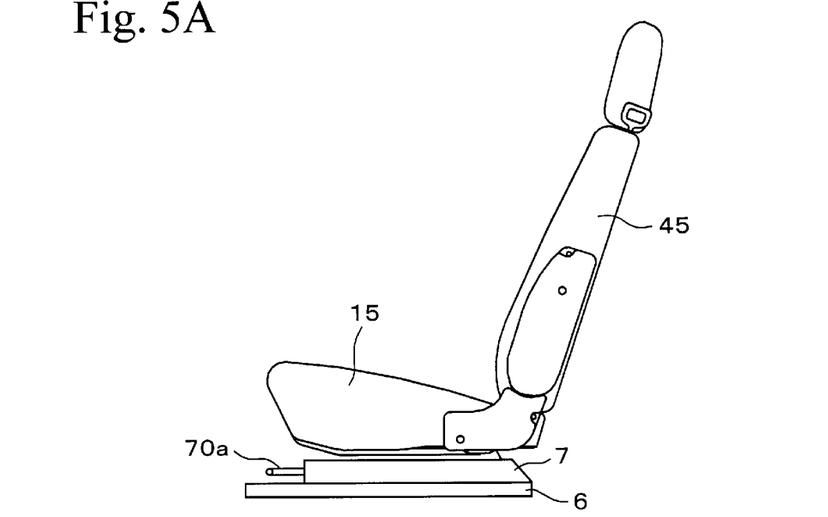
FIG. 5A is a side elevational view showing the entire seat for the vehicle which is used in the embodiment in accordance with the present invention, in a sitting state.
Figure 5B:
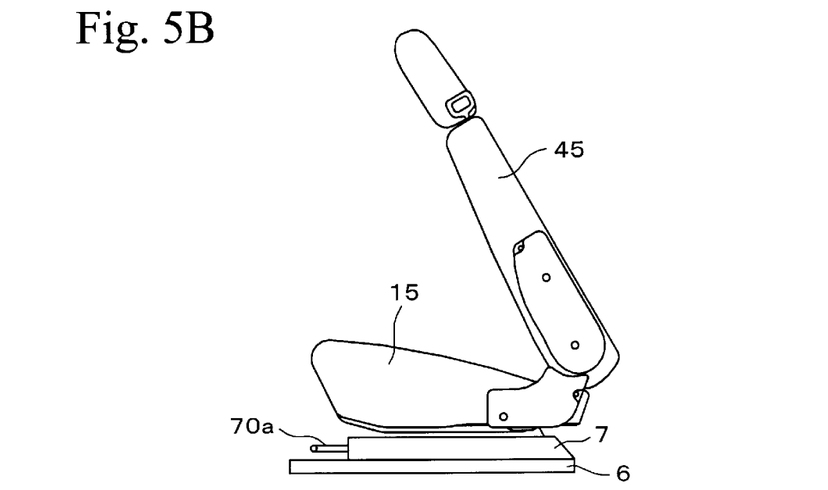
FIG. 5B is a side elevational view showing the entire seat for the vehicle which is used in the embodiment in accordance with the present invention, in a walk-in state.
Figure 5C:
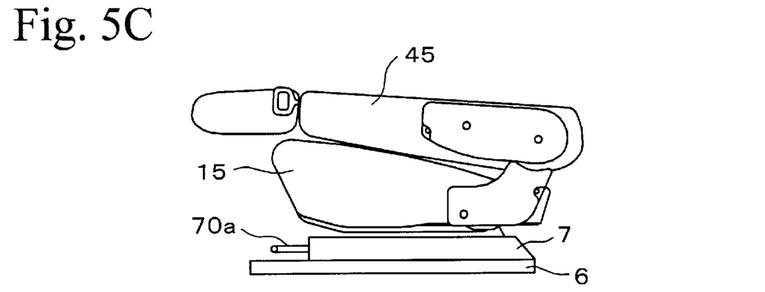
FIG. 5C is a side elevational view showing the entire seat for the vehicle which is used in the embodiment in accordance with the present invention, in a state of being used as a table.

A back bracket 4 constituting a part of a frame of a backrest (a backrest portion; refer to FIG. 5) is rotatably connected to an upper end portion of the sitting portion bracket 1 in the structure mentioned above by an axis 40. The back bracket 4, the axis 40 and the sitting portion bracket 1 constitute a part of a reclining mechanism for the seat, and it is possible to fix the back bracket 4 to the sitting portion seat 1 at a predetermined or optional angle by providing with a known device for detachably engaging the sitting portion bracket 1 and the back bracket 4 with each other.

In this case, a cam 41 having an axis coincident with the axis 40 is fixed to the back bracket 4. In cotrast, a pin 26 protruding at the cam 41 side is fixed to another end portion of the arm 2, and a side surface of the pin 26 is in contact with the cam 41. On the basis of this structure, the cam 41 is rotated by rotating the back bracket 4, and a cam surface of the cam 41 presses the pin 26, whereby the arm 2 is rotated. Furthermore, one end portion of the arm 2 draws out the inner cable 32 from the outer cable 31, thereby making it possible to move the sitting portion 15 in accordance with an operation of the slide rail structure which is described below.

Figure 6:
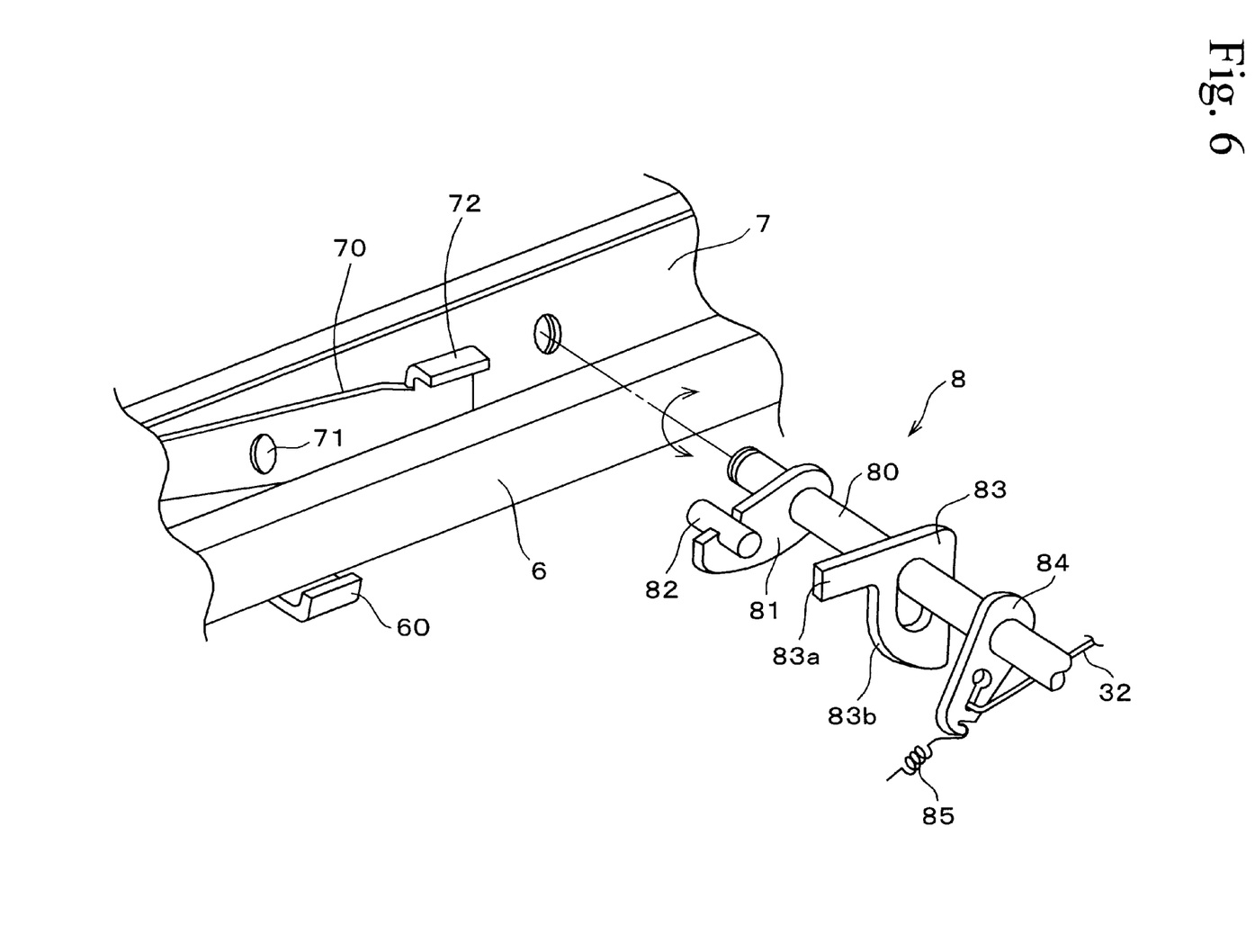
FIG. 6 is a perspective view showing a slide rail structure in accordance with an embodiment.

Next, a description will be given of a structure for the slide rail structure. In FIG. 6, reference numeral 6 denotes a lower rail (a supporting device). The lower rails 6 extend in the longitudinal direction in both of right and left sides of the sitting portion 15. The lower rails include a groove 62 which is continuously formed in a longitudinal direction. A stopper 60 protruding toward an upper side is mounted to one of the lower rails 6. An upper rail (a moving device) 7 is supported to the lower rail 6 so as to freely slide in the longitudinal direction. The sitting portion 15 mentioned above is mounted to the upper rails 7.

A stopper arm (a locking device) 70 is rotatably supported by the upper rail 7 by an axis 712. A front end portion of the stopper arm 70 protrudes to a front side from the sitting portion 15, and the portion is set to an operation portion 70a. A latch (not shown) is formed in a rear end portion of the stopper arm 70 so as to be directed to an upper side, and a serration (not shown) engaging with the latch is continuously provided in the lower rail 6 so as to be directed in the longitudinal direction. Furthermore, the rear end portion of the stopper arm 70 is urged toward the upper side by an elastic member (not shown), and maintains an engagement state between the latch and the serration. Furthermore, a flat portion 72 protruding toward a side direction is formed in the rear end portion of the stopper arm 70. upper side by an elastic member (not shown), and maintains an engagement state between the latch and the serration. Furthermore, a flat portion 72 protruding toward a side direction is formed in the rear end portion of the stopper arm 70.

Next, a lock canceling device 8 is provided in the upper rail 7. In FIG. 6, reference numeral 80 denotes a shaft. The shaft 80 is rotatably supported at the upper rail 7. An arm 81 protruding to a front side is fixed to the shaft 80, and a pin 82 protruding in a lateral direction is fixed to a front end portion of the arm 81. Furthermore, a stopper plate (an engaging device) 83 is mounted to the shaft 80. The stopper plate 83 is supported to a guide (not shown) so as to be capable of moving in parallel in a vertical direction with respect to the shaft 80, and is urged toward a lower side by an elastic member (not shown). Furthermore, a guide 83b formed in a quarter circular shape in a side view is formed in a portion directed to the front side in the lower end portion of the stopper plate 83. In a mounting state of the lock canceling device 8, a right end portion of the pin 82 is positioned in an upper side of a flat portion 72 of the stopper arm 70, and a left end portion of the pin 82 is positioned in a lower side of a front end portion 83a in the stopper plate 83. Furthermore, the stopper 60 is positioned on a moving locus of the stopper plate 83.

Furthermore, a lever 84 is fixed to the shaft 80. A return spring 85 is mounted at a front end portion of the lever 84, and urges the lever 84 in a clockwise direction in FIG. 6. Furthermore, the front end portion of the inner cable 32 in the pull cable 3 is mounted at the front end portion of the lever 84.

B. Operation of Embodiment

Figure 2:
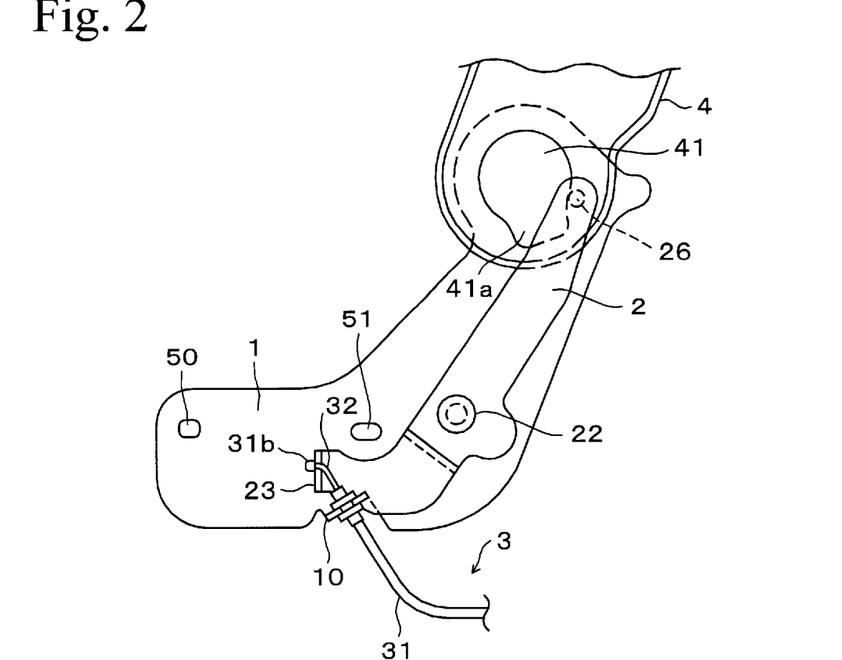
FIG. 2 is a side elevational view showing the seat for the vehicle which is used in the embodiment.

A description will be given of the operation of the slide rail structure having the structure described above. FIG. 2 shows a position of the back bracket 4 when the passenger gets into the seat. In the state shown in FIG. 2, the pin 26 is positioned at a right side of a cam protrusion 41a of the cam 41. The back bracket 4 can be fixed at a backward tilting position in comparison with the state shown in FIG. 2 by a reclining mechanism. In this case, since the cam 41 rotates in a clockwise direction in the drawing, the pin 26 is not pressed by the cam protrusion 41a.

Figure 3:
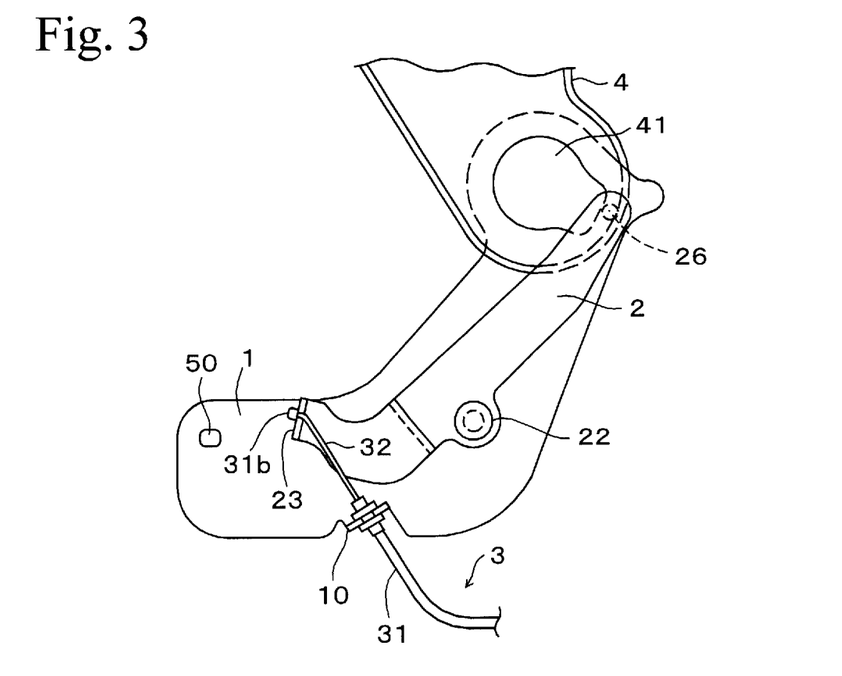
FIG. 3 is a side elevational view showing a state of tilting forward a backrest from the state shown in FIG. 2.
Figure 4:
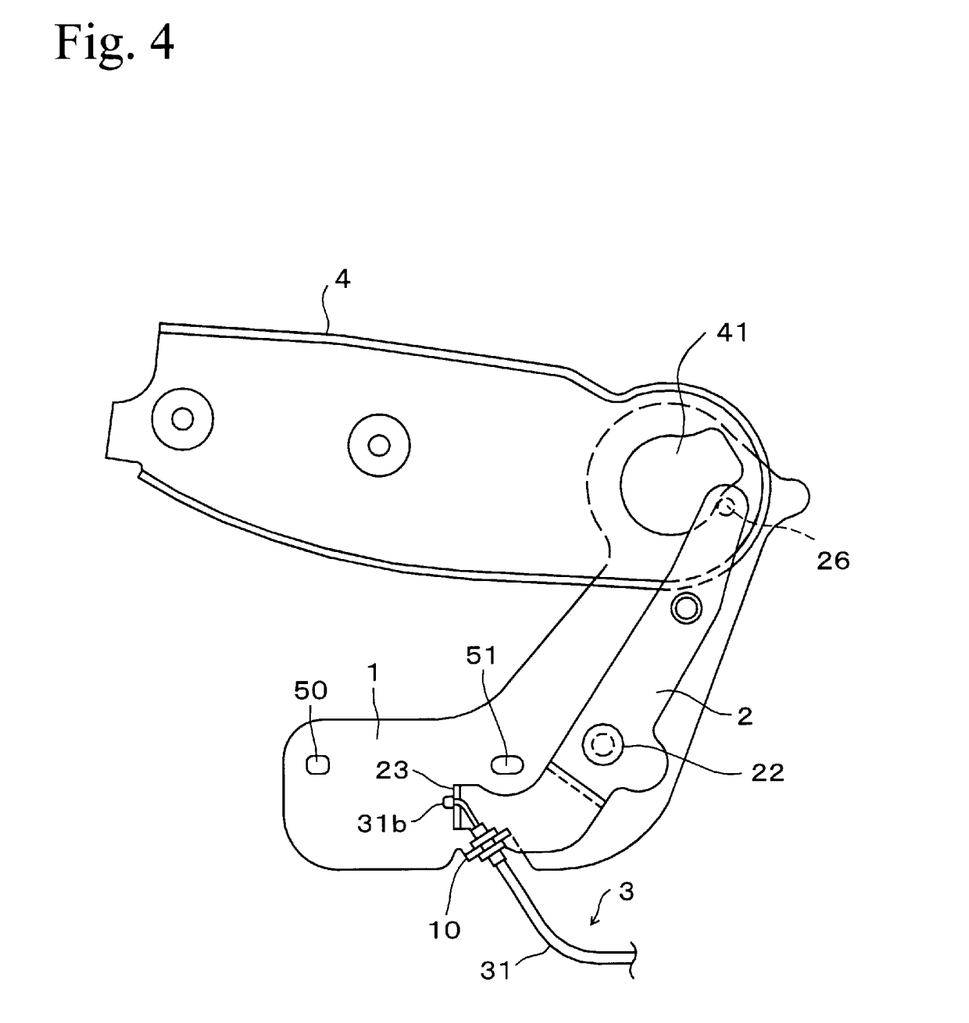
FIG. 4 is a side elevational view showing a state of further tilting forward the backrest from the state shown in FIG. 3 so as to be set in a substantially horizontal state.

In contrast, in the case of making the seat in the walk-in state, the back bracket 4 (the backrest 45) is rotated in a counterclockwise direction from the state shown in FIG. 2. Then, as shown in FIG. 3, the cam protrusion 41a presses the pin 26 so as to rotate the arm 2. Accordingly, the hook 23 of the arm 2 draws out the inner cable 32 from the outer cable 31, and the lever 84 of the lock canceling device 8 rotates in the counterclockwise direction in FIG. 6. Therefore, the pin 82 pushes down the flat portion 72 of the stopper arm 70 against an urging force of the elastic member, and the latch of the stopper arm 70 comes off from the serration of the lower rail 6. Accordingly, the seat (the upper rail 7) enters into a state capable of sliding in the longitudinal direction on the lower rail 6.

Figure 7A:
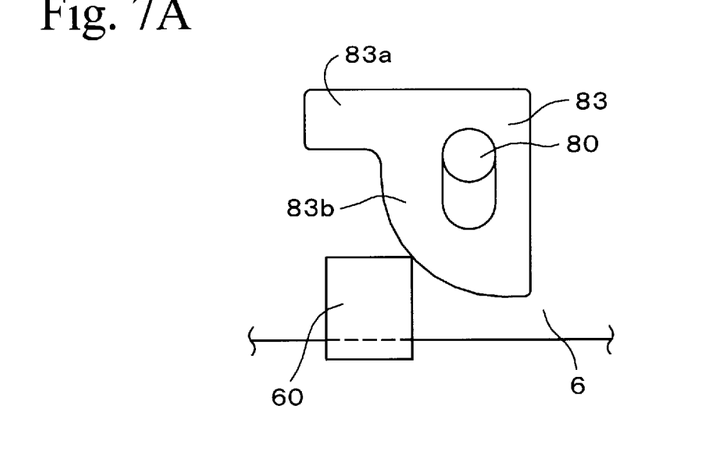
FIGS. 7A, 7B, and 7C are side elevational views showing sequentially the relationship between a stopper plate and a stopper in an embodiment.
Figure 7B:
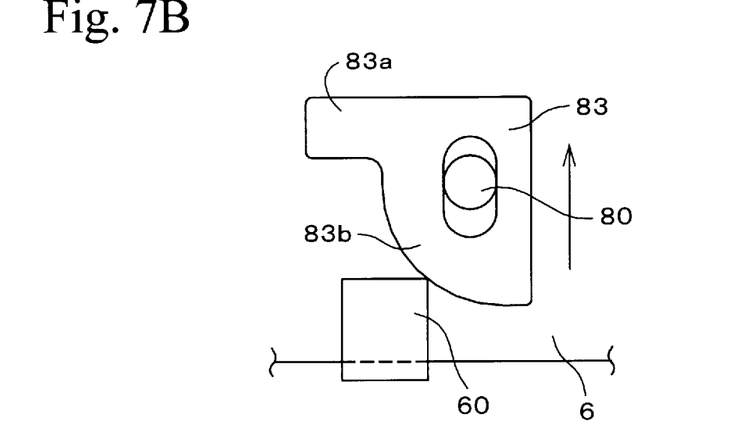
Figure 7C:
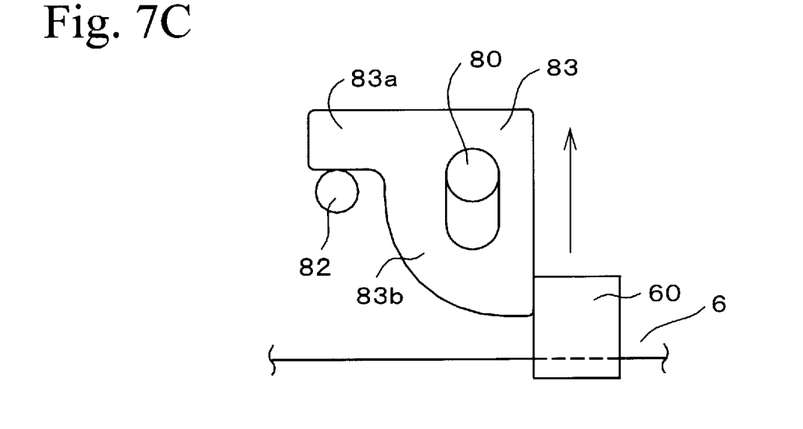

When the seat is moved to the front side, the quarter circular guide 83b of the stopper plate 83 is brought into contact with the stopper 60, as shown in FIG. 7A. When the seat is furthermore moved to the front side, the stopper plate 83 moves upward along the guide 83b against the urging force of the elastic member, as shown in FIG. 7B. Furthermore, when the stopper plate 83 rides over the stopper 60, the stopper plate 83 is moved downward on the basis of the urging force of the elastic member, as shown in FIG. 7C. Then, the seat is moved up to the position in the walk-in state.

Next, in order to change the seat from the walk-in state to the sitting state, the seat is moved to the rear side while the backrest 45 is tilted forward. Then, the rear surface of the stopper plate 83 is brought into contact with the stopper 60, and the seat is stopped there, as shown in FIG. 70. Next, when the backrest 45 is raised so as to be in the sitting state, the cam protrusion 41a comes off from the pin 26. Accordingly, the lever 84 rotates in the clockwise direction in FIG. 6 on the basis of the energizing force of the return spring 85, and the pin 82 pushes up the front end portion of the stopper plate 83 (refer to FIG. 7C). Therefore, the engagement state between the stopper plate 83 and the stopper 60 is cancelled. In contrast, since the pin 82 moves apart from the flat portion 72 of the stopper arm 70, the rear end portion of the stopper arm 70 moves upward on the basis of the urging force of the elastic member, and the latch of the stopper arm 70 is engaged with the serration of the lower rail 6. Then, the engagement state between the latch and the serration is cancelled by raising the operation portion 70a of the stopper arm 70 and moving down the flat portion 72 thereof. The operation portion 70a of the stopper arm being disposed at an end opposite from the flat portion 72. Accordingly, the seat can move to the rear end side. Furthermore, the latch is engaged with the serration by positioning the seat in the sitting state and thereafter returning the operation portion 70a back to the original position. Therefore, the seat is locked in the sitting state.

Next, in the case of using the backrest 45 as a table, the backrest 45 is rotated in the counterclockwise direction from the state shown in FIG. 5B so as to be horizontal as shown in FIG. 5C. Accordingly, the cam protrusion 41a passes through the pin 26, and the pressing force applied to the arm 2 is removed. Furthermore, since the lever 84 rotates in the clockwise direction in FIG. 6 on the basis of the energizing force of the return spring 85 in the lock canceling device 8, and the pin 82 moves apart from the flat portion 72 of the stopper arm 70 in the same manner as mentioned above, the latch of the stopper arm 70 is engaged with the serration of the lower rail 6. Therefore, the seat is locked in the state for using as a table. In this case, when the backrest 45 is rotated in the clockwise direction from the state shown in FIG. 5C so as to be in the sitting state, the engagement between the upper rail 7 and the lower rail 6 is first canceled, and next, both of them are engaged again.

In accordance with the slide rail structure having the structure described above, at a time of moving the seat from the walk-in state to the rear side, the stopper plate 83 provided in the upper rail 7 is engaged with the stopper 60 and does not move up to the rearmost end. Accordingly, the seat does not hit against the rear passenger. Furthermore, since the lock canceling device 8 is operated by raising the backrest 45, it is possible to move the seat to the rear end side rather than the position thereof. In this case, even in the case of moving the seat up to the rearmost end, the speed is not increased due to the short moving distance of the seat. Therefore, there is little risk even if the seat for the vehicle were to hit against the foot of the passenger. Furthermore, since the seat is stopped before reaching the rearmost end, it is possible to draw the operator's attention.

In particular, in the embodiment mentioned above, since the stopper arm 70 capable of engaging with the lower rail 6 is provided in the upper rail 7, it is possible to move the upper rail 7 so as to lock the upper rail 7 with respect to the lower rail 6 at an optional position by operating the operation portion 70a of the stopper arm 70.

Furthermore, in the embodiment mentioned above, since the structure is made such that the lock canceling device 8 pushes down the flat portion 72 of the stopper arm 70 interlocking with the forward tilting operation of the backrest 45, thereby canceling the engagement state between the stopper arm 70 and the lower rail 6, it is possible to move the seat to the front side merely by tilting forward the backrest 45 without operating the operation portion 70a. Furthermore, when the backrest 45 is raised so as to be in the sitting state, the seat is automatically locked. Accordingly, operability is improved and the seat can be easily used.

Furthermore, in accordance with the embodiment described above, since one reclining mechanism can execute the engagement between the upper rail 7 and the lower rail 6 and the engagement cancellation thereof, it is possible to reduce the number of the parts, so that it is possible to reduce the weight and the manufacturing cost. In particular, in the embodiment described above, since the structure is simple such that the lock canceling device 8 is driven by the cam 41 and the arm 1, there is an advantage in that malfunctions occur less often and reliability is high. In addition, since the upper rail 7 and the lower rail 6 are engaged with each other by making the backrest 45 horizontal, the back surface of the backrest 45 does not move when the back surface is used as a table, so that it is easily used.

What is claimed is:

1. A slide rail structure for a seat for a vehicle comprising:
   a supporting device extending in a longitudinal direction of a vehicle; and
   a moving device supported to the supporting device so as to freely move in the longitudinal direction and to which the seat for the vehicle is mounted,
   a stopper is provided in front of a rearmost end position of the moving device;
   an engaging device provided in the moving device which does not engage with the stopper when the moving device is moved to a front side and engages with the stopper when the moving device is moved to a rear side; and
   a lock canceling device for canceling an engagement state between the engaging device and the stopper interlocking with a tilting operation of a backrest portion of the seat for the vehicle,
   wherein the engaging device does not engage with the stopper when the backrest portion is vertically positioned for sitting,
   wherein the engaging device can engage with the stopper by being actuated by the backrest portion when the backrest portion is tilted forward at a predetermined angle, and
   wherein the engaging device does not engage with the stopper by being actuated by the backrest portion when the backrest portion is further tilted forward to an approximately horizontal position.

2. A slide rail structure for a seat for a vehicle as claimed in claim 1, wherein a locking device capable of engaging with the supporting device is provided in the moving device, the locking device is elastically urged in a direction so as to engage with the supporting device.

3. A slide rail structure for a seat for a vehicle as claimed in claim 2, wherein, an operation portion for manually canceling an engagement state with the supporting device is provided in the locking device.

4. A slide rail structure for a seat for a vehicle as claimed in claim 3, wherein the lock canceling device moves the locking device interlocking with a forward tilting motion of the backrest portion so as to cancel the engagement state between the locking device and the supporting device.

5. A slide rail structure for a seat for a vehicle as claimed in claim 4, wherein the lock canceling device is operated by raising the backrest portion.

6. A slide rail structure for a seat for a vehicle as claimed in claim 2, wherein
   the lock canceling device engages the locking device with the supporting device when the backrest portion is Vertically positioned for sitting;
   the lock canceling device cancels an engaging state between the locking device and the supporting device by being actuated by the backrest portion when the backrest portion is tilted forward at a predetermined angle; and
   the lock canceling device engages the locking device with the supporting device by being actuated by the backrest portion when the backrest portion is further tilted forward to an approximately horizontal position.

7. A slide rail structure for a seat for a vehicle as claimed in claim 1, wherein the engaging device comprises a stopper plate movably supported by the moving device in a vertical direction,
   the stopper plate has a guide surface at a portion directed to a front side,
   the stopper plate moves upward along the guide surface when the guide surface is brought into contact with the stopper, whereby the stopper plate passes over the stopper and allows the moving device to move forward.

8. A slide rail structure for a seat for a vehicle as claimed in claim 1, wherein the lock canceling device includes a cam coaxial with a rotating shaft of the backrest portion and an arm of which an intermediate portion between both end portion is rotatably supported by the moving device,
   the end portion of the arm slides over the cam, other end portion of the arm is connected to the stopper plate, whereby the stopper plate is moved upward due to rotation of other end portion in a direction.

9. A slide rail structure for a seat for a vehicle as claimed in claim 8, wherein the lock canceling device includes a shaft connected to the arm so as to rotate in the same direction as a rotation direction of the arm, the shaft includes an actuating member which rotates according to the rotation of the shaft, thereby raising the stopper plate.

10. A slide rail structure for a seat for a vehicle as claimed in claim 9, wherein the actuating member rotates downwardly and moves the locking device downward, thereby canceling an engaging state between the locking device and the supporting device.

* * * * *